United States Patent
Doucette

(10) Patent No.: US 9,857,869 B1
(45) Date of Patent: Jan. 2, 2018

(54) DATA OPTIMIZATION

(71) Applicant: Amazon Technologies, Inc., Reno, NV (US)

(72) Inventor: Jason Allen Doucette, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 25 days.

(21) Appl. No.: 14/307,113

(22) Filed: Jun. 17, 2014

(51) Int. Cl.
*G06F 3/01* (2006.01)
*G06K 9/00* (2006.01)

(52) U.S. Cl.
CPC .............. *G06F 3/012* (2013.01); *G06F 3/013* (2013.01); *G06K 9/00597* (2013.01)

(58) Field of Classification Search
None
See application file for complete search history.

(56) References Cited

U.S. PATENT DOCUMENTS

| | | | |
|---|---|---|---|
| 5,421,453 A | 6/1995 | Harrer et al. | |
| 6,222,465 B1 | 4/2001 | Kumar et al. | |
| 6,392,667 B1 | 5/2002 | McKinnon et al. | |
| 6,421,453 B1 | 7/2002 | Kanevsky et al. | |
| 6,681,031 B2 | 1/2004 | Cohen et al. | |
| 6,956,566 B2 | 10/2005 | Gelb | |
| 7,033,025 B2 | 4/2006 | Winterbotham | |
| 7,104,891 B2 | 9/2006 | Osako et al. | |
| 7,308,112 B2 | 12/2007 | Fujimura et al. | |
| 7,359,817 B2 | 4/2008 | Ban et al. | |
| 7,499,569 B2 | 3/2009 | Sato et al. | |
| 7,725,547 B2 | 5/2010 | Albertson et al. | |
| 7,971,156 B2 | 6/2011 | Albertson et al. | |

(Continued)

FOREIGN PATENT DOCUMENTS

| CN | 1661621 | 8/2005 |
|---|---|---|
| CN | 1727839 | 2/2006 |

(Continued)

OTHER PUBLICATIONS

Thornwood, "Method for Access Control Via Gestural Verification," IBM Technical Disclosure Bulletin, International Business Machines Corp., vol. 36, No. 9B, Sep. 1, 1993, pp. 487-488.

*Primary Examiner* — Seokyun Moon
(74) *Attorney, Agent, or Firm* — Polsinelli LLP

(57) ABSTRACT

A service such as an object tracking optimization service of a computing device is configured to optimize the use of object tracking information by, e.g., smoothing, averaging, or otherwise processing the information. Approaches enable the object tracking optimization service to acquire object tracking information (e.g., position information) at a variable input rate and provide the information to applications, services, and the like which require such information at variable rates. The information can be used to display image content (e.g., still or video content) in such a way that the image content will appear, to a viewer, to include portions with different locations in physical space, with the relative positioning of those portions being determined at least in part upon a current relative position and/or orientation of the viewer with respect to the device, as well as changes in that relative position and/or orientation.

20 Claims, 7 Drawing Sheets

(56) References Cited

U.S. PATENT DOCUMENTS

| | | |
|---|---|---|
| 8,183,977 B2 | 5/2012 | Matsumoto |
| 8,350,896 B2 | 1/2013 | Kawakami et al. |
| 8,378,970 B2 | 2/2013 | Nishida et al. |
| 8,760,422 B2 | 6/2014 | Ikeda |
| 8,954,884 B1* | 2/2015 | Barger ................. G06F 3/0485 705/3 |
| 9,158,454 B2 | 10/2015 | Westerman et al. |
| 9,172,945 B2 | 10/2015 | Mohammed Amin et al. |
| 2003/0138130 A1 | 7/2003 | Cohen et al. |
| 2003/0156756 A1 | 8/2003 | Gokturk et al. |
| 2004/0032409 A1 | 2/2004 | Girard |
| 2006/0013440 A1 | 1/2006 | Cohen et al. |
| 2006/0017692 A1 | 1/2006 | Wehrenberg et al. |
| 2006/0020898 A1 | 1/2006 | Kim et al. |
| 2006/0038881 A1 | 2/2006 | Starkweather et al. |
| 2007/0236485 A1 | 10/2007 | Trepte |
| 2008/0069438 A1 | 3/2008 | Winn et al. |
| 2008/0107303 A1 | 5/2008 | Kim et al. |
| 2008/0140481 A1 | 6/2008 | Gold |
| 2008/0168403 A1 | 7/2008 | Westerman et al. |
| 2008/0170776 A1 | 7/2008 | Albertson et al. |
| 2008/0211813 A1 | 9/2008 | Jamwal et al. |
| 2008/0266289 A1 | 10/2008 | Park |
| 2008/0273764 A1 | 11/2008 | Scholl |
| 2009/0102788 A1 | 4/2009 | Nishida et al. |
| 2009/0103780 A1 | 4/2009 | Nishihara et al. |
| 2009/0184981 A1 | 7/2009 | de Matos |
| 2009/0296989 A1 | 12/2009 | Ramesh et al. |
| 2009/0313584 A1 | 12/2009 | Kerr et al. |
| 2010/0023878 A1 | 1/2010 | Douris et al. |
| 2010/0052851 A1 | 3/2010 | Kaehler |
| 2010/0079426 A1 | 4/2010 | Pance et al. |
| 2010/0103172 A1 | 4/2010 | Purdy, Sr. |
| 2010/0125816 A1 | 5/2010 | Bezos |
| 2010/0225743 A1 | 9/2010 | Florencio et al. |
| 2011/0001813 A1 | 1/2011 | Kim et al. |
| 2011/0026765 A1 | 2/2011 | Ivanich et al. |
| 2011/0029903 A1 | 2/2011 | Schooleman et al. |
| 2011/0145718 A1 | 6/2011 | Ketola et al. |
| 2011/0221667 A1 | 9/2011 | Lee |
| 2011/0243388 A1 | 10/2011 | Sakaguchi et al. |
| 2012/0256967 A1* | 10/2012 | Baldwin ................. G06F 3/013 345/684 |
| 2013/0004016 A1* | 1/2013 | Karakotsios ....... G06K 9/00355 382/103 |
| 2013/0016102 A1* | 1/2013 | Look ...................... G06T 15/20 345/426 |
| 2013/0162535 A1 | 6/2013 | Nishida et al. |
| 2014/0062881 A1* | 3/2014 | Solomon ................. G09G 5/006 345/158 |

FOREIGN PATENT DOCUMENTS

| | | |
|---|---|---|
| CN | 101419498 | 4/2009 |
| CN | 101609362 | 12/2009 |
| CN | 101663692 | 3/2010 |
| JP | 2000-222361 | 8/2000 |
| JP | 2002-142255 | 5/2002 |
| JP | 2004-271671 | 9/2004 |
| JP | 2007-141002 | 6/2007 |
| JP | 2008-516352 | 5/2008 |
| JP | 2008-129775 | 6/2008 |
| JP | 2009-087111 | 4/2009 |
| JP | 2009-104297 | 5/2009 |
| JP | 2010-122879 | 6/2010 |
| JP | 2011-048665 | 3/2011 |
| JP | 2011-065652 | 3/2011 |
| WO | WO 2009/127701 | 10/2009 |

* cited by examiner

DATA OPTIMIZATION

BACKGROUND

People are increasingly interacting with computers and other electronic devices in new and interesting ways. For example, certain devices utilize one or more cameras to attempt to detect motions or locations of various objects, such as for head tracking or motion input. The location of these objects relative to the device can be used to the adjust content displayed on a display screen of the device. For example, the devices can enable image content (e.g., still or video content) to be displayed to provide a viewer with an appearance or view of the content that is based upon a current relative position and/or orientation of the viewer with respect to the device, as well as changes in that relative position and/or orientation. The content can include various portions, and different adjustments can be applied to each portion based upon these and/or other such changes. These adjustments can include, for example, changes due to parallax or occlusion, which when added to the rendered content in response to relative movement between a viewer and a device can enhance the experience of the viewer and increase realism for content rendered on a two- or three-dimensional display screen. Often times, however, the data corresponding to the current relative position and/or orientation of the viewer with respect to the device may not be accurate, and thus, the virtual nature of the displayed content can be significantly degraded. Further, as is often the case with such devices, slight changes in position of the device may result the drastic adjustments to the displayed content, further degrading the user's experience.

BRIEF DESCRIPTION OF THE DRAWINGS

Various embodiments in accordance with the present disclosure will be described with reference to the drawings, in which.

DETAILED DESCRIPTION

Figure 1:
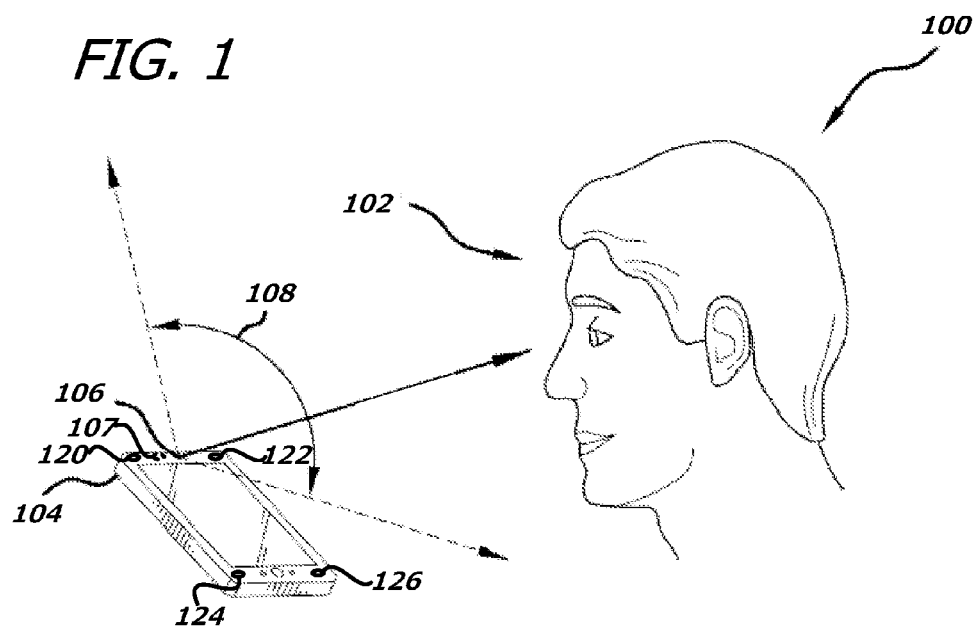
FIG. 1 illustrates an example situation wherein a computing device is capturing an image of a user in accordance with various embodiments.

Systems and methods in accordance with various embodiments of the present disclosure may overcome one or more of the aforementioned and other deficiencies experienced in conventional approaches for optimizing functionality in an electronic device. In particular, various embodiments enable a service such as an object tracking optimization service or other data optimizing component of a computing device (e.g., a mobile phone, tablet computer, etc.) or other electronic device to optimize the use of object tracking information (e.g., position information) by, e.g., smoothing, averaging, or otherwise processing the information. Approaches enable the object tracking optimization service or other data optimizing component to acquire position information and provide the information to rendering components such as applications, services, and the like which require such information at variable rates. In certain embodiments, the information can be used to display image content (e.g., still or video content) in such a way that the image content will appear, to a viewer, to include portions with different locations in physical space, with the relative positioning of those portions being determined at least in part upon a current relative position and/or orientation of the viewer with respect to the device, as well as changes in that relative position and/or orientation. The content can include various portions, and different adjustments can be applied to each portion based upon these and/or other such changes. These adjustments can include, for example, changes due to responsiveness of a change in appearance of content, parallax, or occlusion, which when added to the rendered content in response to relative movement between a viewer and a device can enhance the experience of the viewer and increase realism for content rendered on a two- or three-dimensional display screen.

For example, in accordance with various embodiments, the position information can be acquired using a number of different approaches. In one such approach, using a camera of the device, at least one image of a viewer of the computing device can be acquired, and by analyzing the image data, position information indicative of a position of the viewer with respect to the computing device can be determined. In another such approach, the relative position and/or orientation of a viewer of a computing device can be determine using sensor information from one of more motion sensors (e.g., a gyroscope, an accelerometer, magnetic compass, etc.) of the device. The sensors can be used to detect changes in the orientation and/or position of the device, in order to provide for a higher sampling frequency than might otherwise be possible using the image data captured by the camera, or otherwise attempt to improve the relative position determinations. In yet another approach, an object tracking subsystem can be used to acquire position information, where the object tracking subsystem can aggregate and merged position data acquired from one or more sources on the device. In still another approach, a sensor that is remote, separate, or otherwise in communication with the device can be used to detect a change in orientation and/or position of the device and the position information can be received at the device from the sensor. In any situation, in accordance with various embodiments, as the relative position of the viewer and/or orientation of the device changes, the position data indicative of the position of the viewer with respect to the computing device changes and the updated position data can be used to adjust the perspective from which the content is rendered to correspond to changes in the relative viewing angle of the viewer.

In certain embodiments, the position information (herein also known as new or current position information) can be received at an object tracking optimization service, rendering component, data optimizing component, or the like at a first variable rate. The new position information can be associated with a first weighting factor, where the first weighting factor can correspond to a strength of the new position information. Second position data (herein also known as previously averaged position information) can be acquired by the object tracking optimization service at a second variable rate, where the first variable rate of acquiring the new position information can be different (or the same) than the second variable rate of acquiring the averaged position information. In various embodiments, the first variable rate can correspond to a rate at which position information is determined and the second variable rate can correspond to a rate at which content is rendered on a display screen, for example. The previously averaged position information can be associated with a second weighting factor, where the second weighting factor can correspond to a portion or percentage of the first weighting factor. Averaged position information can be generated using at least one averaging algorithm based at least in part on the new position information and corresponding first weighting factor and the previously averaged position information and corresponding second weighting factor. The averaged position information can be acquired by a rendering component, service or other component, and can be used by the rendering component to render content. For example, portions of image content (e.g., graphical elements, text, etc.) can appear to be positioned and/or displayed in 3D space such that some of the content appears closer to a surface of the display screen of the device (and hence the viewer), while other content appears to be further from the surface of the display screen. As the viewer tilts, rotates, or otherwise changes the orientation of the device, or as the viewer's relative position or orientation changes with respect to the device, the content can appear to translate laterally, move back and forth in apparent distance from the surface of the screen, or otherwise change shape or appearance. The relative movements can be based upon factors such as the distance of the viewer to the device, a direction of movement of the user, a direction of change in orientation of the device, or other such factors. The relative movements can be selected such that the different content appears to be positioned in three dimensions with respect to each other, and act appropriately with changes in relative position and/or orientation, and thus viewing angle, of the viewer. Further, the responsiveness, e.g., how quickly a change in position of the viewer with respect to the device affects the appearance of content displayed, can be modified by adjusting one or more weighing factors, confidence factors, and the like to account for various application and system requirements.

Accordingly, the averaged position information can provide advantages in various image processing applications such as various gesture- and/or motion-based input that can be used for head tracking, gaze tracking, and the like. Such approaches enable relatively complex gestures to be interpreted and object tracking to be performed with lower cost and power consumption than conventional approaches. Various other functions and advantages are described and suggested below as may be provided in accordance with the various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 positioned on a front, side, or corner of the device such that the camera will likely be able to capture image data of at least a portion of the user while the user is viewing content displayed on the device. For example, the camera 106 in FIG. 1 is on the front of the device such that an angular capture range 108 of the camera can image at least a portion of the user while the viewer is viewing content displayed on the display element of the electronic device. In accordance with various embodiments, being able to capture image data for the user enables the device to determine a relative position and/or orientation of the user with respect to the device and adjust a display of content on the device in accordance with that position and/or orientation. In accordance with the illustrated embodiment, the device further includes a rear-facing camera 107 and four corner cameras (120, 122, 124, 126) also located on the front of the device. These cameras can be used to acquire images and the image data for each image can be used by the device to determine a relative position and/or orientation of the user with respect to the device. Such image data can also be used for object recognition, object tracking, or various other purposes.

It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture image data useful for performing facial recognition, and might have a lower resolution video camera that can be useful for performing object detection. In other embodiments, a single camera might be used to capture image data for both types of analysis, while still other embodiments might utilize stereo cameras or other elements to determine distance information or perform three dimensional modeling, among other such aspects. As mentioned, some devices might have digital still cameras that are able to capture single images at specific points in time, or digital video cameras that are able to continuously capture image data, which can be referred to as a set of frames in at least some embodiments. Also, for a process such as image recognition to be relatively accurate, the image being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

Figure 2:
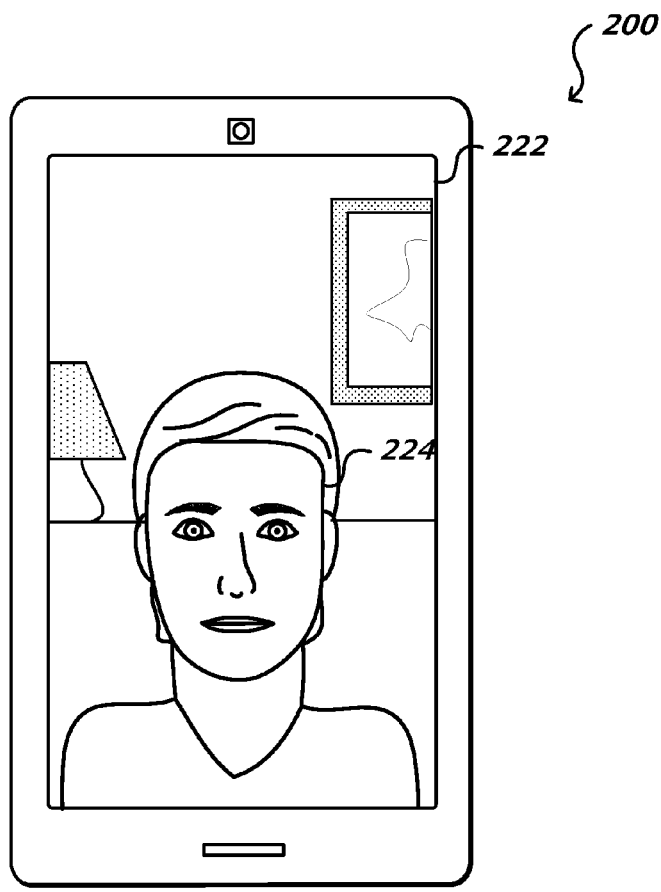
FIG. 2 illustrates an example of how a device might use an image data to perform object tracking in accordance with various embodiments.

In this example, the device 104 is analyzing image data captured by the image capture element 106 to attempt to determine whether the head of the user is present in the field of view 108 of the camera 106. If so, the device will attempt to determine the relative position of the user's head to the device, in order to track the users head or perform another such action such as how to render content on a display of the device. For example, as illustrated in the example 200 of FIG. 2, a portion of the user 224 is represented in an image captured by the device, here displayed on a display screen 222 of a computing device for simplicity of explanation, although such display is not utilized in many embodiments. As illustrated, the head and shoulders of the user are represented in the image. As illustrated, there are also several other objects in the image, including objects such as a painting, a lamp, and a desk. In order to determine the position of the user and/or track the position of the user, it is necessary to first identify the portion of the image that corresponds to the user's head. At least one approach uses object recognition or other such processes to attempt to recognize the head based on various features, patterns, or other such information. Another approach uses sensor information from one of more motion sensors (e.g., a gyroscope, an accelerometer, etc.) of the device. For example, changes in the orientation and/or position of the device can be determined using at least one motion sensor of the device, in order to provide for a higher sampling frequency than might otherwise be possible using the image data captured by the camera, or otherwise attempt to improve the relative position determinations. In yet another approach, the position information can be generated by a service that takes into account one or more approaches (e.g., image-based, sensor-based, etc.).

At the 'on draw frame' of an application, which could be 60 Hz for a maps application, 30 Hz for a games application, etc., the position information is acquired from an object tracking subsystem configured to generate position information, from a storage component storing the information, or from another source. Accordingly, the subsystem generates the position information (e.g., at a rate of 15 or 30 Hz) and an application can acquire the position information at a rate at which the application requires such data to render graphics. For example, the application can acquire position information at a rate faster than a rate at which the information is generated. As discussed, however, the information corresponding to the current relative position and/or orientation of the viewer with respect to the device may not be accurate, and thus, the virtual nature of the displayed content can be significantly degraded. Further, as is often the case with such devices, slight changes in position of the device may result the drastic adjustments to the displayed content, further degrading the user's experience.

Accordingly, in accordance with various embodiments, an object tracking optimization service or other data optimizing component of a computing device can be utilized to optimize position information by, e.g., smoothing, averaging, or otherwise processing the information. Approaches enable the object tracking optimization service to acquire position information and make available the information to applications, services, and the like. For example, the position data can be injected into the object tracking optimization service at the rate it is generated (e.g., 15 or 30 Hz or some other rate) and acquired for use by an application at a different rate (e.g., 60 Hz or some other rate). Advantageously, in accordance with various embodiments, although the object tracking optimization service may acquire the same position data more than once, the result of the service does not return the same result merely because the input value remains the same; rather, previously averaged position information can be used in one or more smoothing algorithms of the object tracking optimization service to generate optimized (e.g., averaged) position information. Thereafter, the optimized position information can be used to display image content (e.g., still or video content) in such a way that the image content can appear, to the viewer, to include portions with different locations in physical space, with the relative positioning of those portions being determined at least in part upon a current relative position and/or orientation of the viewer with respect to the device, as well as changes in that relative position and/or orientation.

Figure 3A:
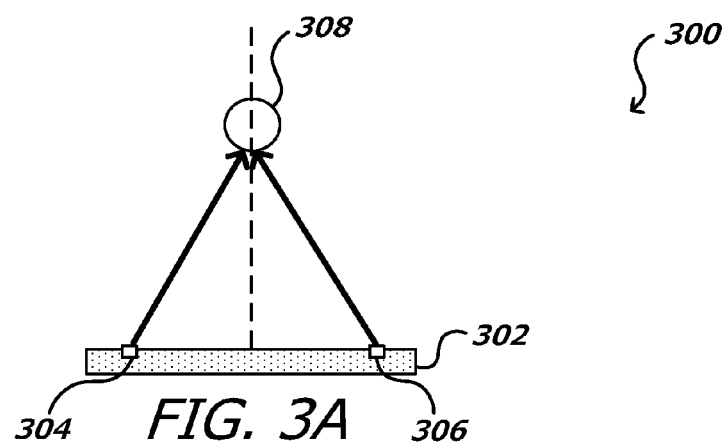
FIGS. 3A, 3B, 3C, and 3D illustrate an example situation where changes in relative head position of a user can be determined using image data in accordance with various embodiments.

As described, the position of an object (e.g., a head of a viewer of a computing device) can be derived from at least one of image data acquired by at least one camera, sensor information acquired by at least one motion sensor (e.g., a gyroscope, an accelerometer, etc.), or position data provided by an object tracking subsystem. In accordance with an embodiment, determining position data using image data can include determining a head or other object location in a set of subsequently captured images, where these locations can be compared for purposes of head tracking. For example, FIG. 3A illustrates a top view 300 of a situation wherein the user's head 308 is relatively centered with respect to the display screen (i.e., along a normal vector to the center of the screen). In this example, the computing device 302 has a pair of cameras 304, 306 that are configured to capture stereoscopic image data such that the disparity information can be used to determine, in three dimensions, the relative location of the head to the device. Methods for determining distance using disparity data are well known in the art and, as such, will not be discussed in detail herein. The pair of cameras can be part of a single camera assembly that can be used to capture stereoscopic images, or other types of three-dimensional data, where offsets in position (or disparity) due to the offset of the cameras can be used to calculate distance, and can be used to display an image that appears to a user to show objects at their respective distances. In some embodiments, a camera assembly might include a single camera or sensor for capturing images that are able to be used to infer three-dimensional position information. For example, a camera assembly might include an infrared (IR) emitter and capture reflected IR such that distance can be inferred by the relative intensity of the reflected IR. In other embodiments, a camera assembly might include a single camera with a proximity sensor or distance sensor, for example, such that the camera assembly can provide both image and distance data, which can be used to calculate three-dimensional position information. A proximity or distance sensor can include, for example, an ultrasonic sensor, an electromagnetic sensor, a capacitive sensor, a magnetic sensor, and the like, which is able to determine a distance to one or more objects with respect to the sensor. Various other types of camera assemblies can be used as well within the scope of the various embodiments.

Figure 3B:
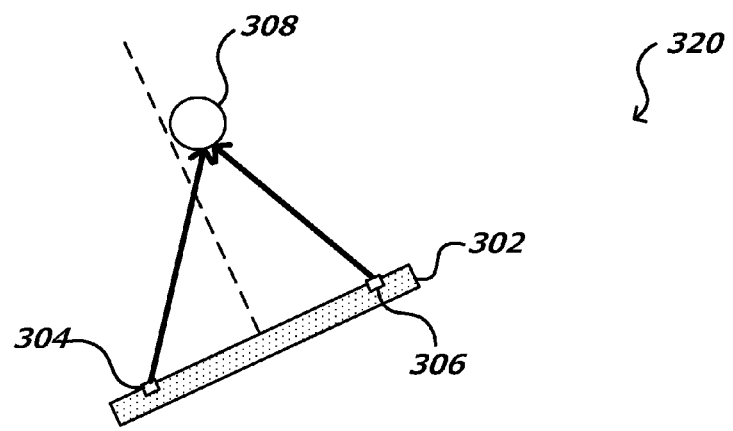
Figure 3C:
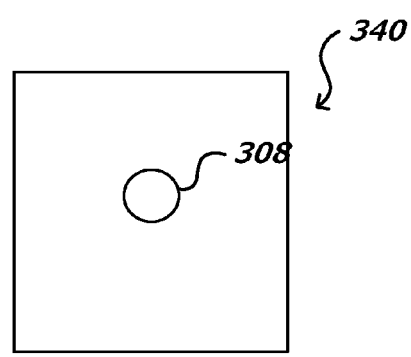
Figure 3D:
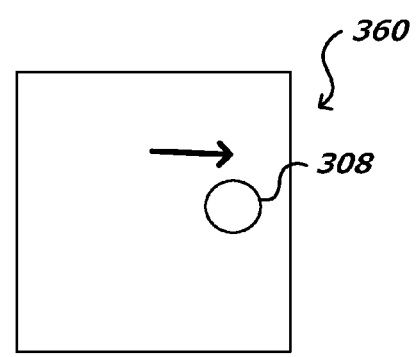

If the device 302 is rotated and/or the head 308 moves as illustrated in the example situation 320 of FIG. 3B, the head may no longer be in the same location along the normal, but may be offset in the captured image data. For example, the image 340 in FIG. 3C illustrates the head 308 in the center of the image, while the image 360 in FIG. 3D illustrates that the position of the head 308 has shifted in the image due to the change in relative position. It should be understood that the images 340, 360 can be three-dimensional images generated using the images captured by each of the stereo cameras 304, 306. As described, the position information obtained using the image data at a first rate (e.g., a rate of about 6 hz) can be merged with the position information obtained at a second rate (e.g., a rate of about 120 hz) to generate position information at a combined rate. Approaches for combining position information from a first source generated at a first rate with position information from a second source generated at a second rate are known in the art and will not be discussed herein. The combined position information (or the new position information) can be acquired by an object tracking optimization service for further processing.

Figure 4A:
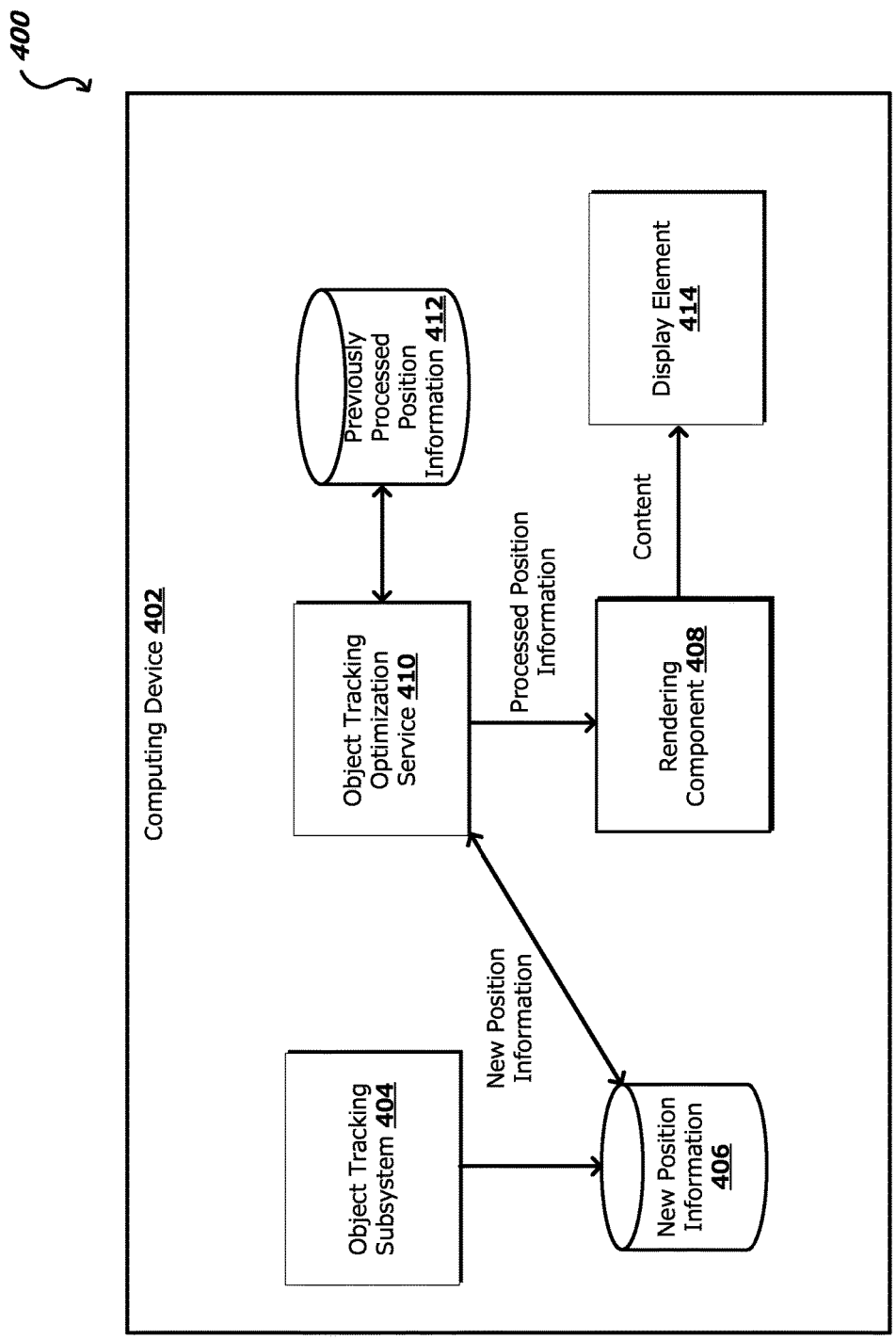
FIG. 4A illustrates components of an object tracking optimization service in accordance with an embodiment.

As described, the position data corresponding to the current relative position and/or orientation of the viewer with respect to the device may not be accurate, and thus, the virtual nature of the displayed content that is based on the position data can be significantly degraded. Further, as is often the case with such devices, slight changes in position of the device may result the drastic adjustments to the displayed content, further degrading the user's experience. Accordingly, the position information can be smoothed or otherwise optimized to account for the different rates at which the position data is acquired. For example, FIG. 4A illustrates an example situation 400 of at least one approach to optimizing position information. In this example, a computing device 402 such as a portable computing device can include an object tracking subsystem 404 that can provide new position information corresponding to a position of an object with respect to the computing device, a data repository 406 that can store at least the new position information, at least one application or service 408, an object tracking optimization service 410, a data repository 412 that can store at least previously averaged position information, and a display element 414 that can render content that has been generated based at least in part on the averaged position information. As described, the object tracking optimization service 410 can be configured to optimize position information by, e.g., smoothing, averaging, or otherwise processing the position information. Approaches enable the object tracking optimization service to acquire object tracking information (e.g., position information of an object with respect to the device) and provide the information to rendering components, applications, services, and the like for purposes such as to render a display on a display element of the device.

For example, the object tracking subsystem 404 can determine new position information corresponding to a position of an object (e.g., a viewer's head) with respect to the computing device and the new position information can be stored in a data repository (e.g., data repository 406). As described, the position information can be determined in a number of ways, as may include a dedicated service configured to provide such data or determined from data acquired from one or more sensors of the device. For example, the position information can be determined from images captured by one or more cameras of the device, or a motion sensor such as a gyroscope, an accelerometer, and the like. As described, the position information determined from each sensor may be determined at different rates. For example, position information determined using image data may be determined at a rate of, for example, six times a second (i.e., at a rate of 6 Hz) while the position information determined using the accelerometer and/or gyroscope may be determined at a rate of, for example, 120 times a second (i.e., at a rate of 120 Hz). In certain embodiments, the object tracking subsystem can merge the position information determining from the data acquired by the various sensors into combined position information, wherein the combined position information can be generated at a rate based at least in part on the rates of the sensors being used to acquire the data to generate the position information. For example, position information determined using image data at a rate of 6 Hz can be merged with position information determined using a motion sensor such as the accelerometer and/or gyroscope determined at a rate 120 Hz. It should be noted that the rate at which the position information is determined for each one of the sources of position information can vary depending on certain conditions and the merged rate can vary as well. It should be further noted that approaches and techniques for combining and/or otherwise merging position information derived from one or more sources is known as will not be discussed herein. Further still, such position information can be provided by one or more services or components and need not to be acquired or determined directly from such sources. In this way, one or more application programming interfaces (APIs) can be provided to acquire the position information from a central service such as the object tracking subsystem.

The position information (i.e., new position information) can be stored in data repository 406, provided to the object tracking optimization service 410 or application, or stored at the object tracking subsystem to be acquired by a rendering component 408 or another component, service, application, etc. of the device. As shown in FIG. 4A, the new position information is stored in data repository 406. The object tracking optimization service 410 can acquire the new position information from data repository 406. Alternatively, the rendering component 408 can acquire the new position information from the data repository 406 and can provide the new position information to the object tracking optimization service 410.

The object tracking optimization service can, for example, optimize the new position information using one or more optimization functions, algorithms, equations, or the like. For example, in accordance with various embodiments, one or more optimization algorithms or equations can be used to smooth, average, or otherwise process the new position information. The optimization algorithms can include, for example, moving average algorithms or other smoothing algorithms. The moving average algorithms can include, for example, a simple moving average, a cumulative moving average, a weighted moving average, an exponential moving average, among others. The simple moving average (SMA) is an unweighted mean of the previous n datum points (e.g., position data). In the cumulative moving average, the data arrive in an ordered datum stream, and provides for the average of all of the data up until the current datum point. The weighted average is any average that includes multiplying factors to give different weights to data at different positions in the sample window. The exponential moving average (EMA), also known as an exponentially weighted moving average (EWMA), is a type of infinite impulse response filter that applies weighting factors which decrease exponentially. In accordance with various embodiments one of the optimization functions can be illustrated as:

averaged position information=(new position information strength)*(new position information)+ (100%−new position information strength)* (previously averaged position information))

In this example, the new position information can be representative of a position of an object with respect to the computing device, where the new position information can include physical space coordinates (e.g., x, y, and z) of the object with respect to the computing device 402. As described, using a camera of the device, at least one image of a viewer of the computing device can be acquired, and by analyzing the image, position information indicative of a position of the viewer with respect to the computing device can be determined. Additionally or alternatively, the relative position and/or orientation of a viewer of a computing device can be acquired using one of more motion sensors (e.g., a gyroscope, an accelerometer, etc.) of the device. As further described, the position information determined using the image data at a first rate (e.g., a rate of about 6 Hz) can be merged with the position information obtained using a motion sensor such as a gyroscope and/or accelerometer at a second rate (e.g., a rate of about 120 Hz) to generate position information at a combined rate.

The new position information strength or weighting factor can be representative of a strength of the new position information. For example, a high strength gives more weight to new position data and can result in a view that is responsive to changes in position. A low strength gives less weight to new position data and more weight to previously averaged position data and can result in a view that appears to adjust more smoothly. As described, the previously averaged position information can be representative of position information previously averaged by the optimization algorithm (e.g., an exponential moving average algorithm, averaging algorithm, or other smoothing algorithm).

In certain embodiments, the new position information strength can be adjusted based on a number of factors. These factors can include, for example, the type of rendering component (e.g., gaming application, mapping application) using the position information to render a display, request rate for position data (e.g., how often the rendering component or service requests the position data), power level of the device, a render rate for a display, etc. In accordance with various embodiments, a number of approaches can be used to determine the new position information strength. One such approach can be illustrated as:

new position information strength=100%−(100%− penetration percentage)^ (1/num steps)

In this example, num steps can be representative of the number of injections of position data or frames of position data. The penetration percentage can be representative of the strength or control power of the injections position data. For example, in the situation where content is rendered on a display based on position data generated at a rate of 60 Hz, and num step is one tenth of a second (e.g., six frames), and it is desired that the position data from these six frames controls ninety percent of what is displayed on the display, then the new position information strength would be 100−(100−90))^ (1/6). It should be noted that the penetration percentage and the num steps can be adjusted to account for different situations. For example, certain rendering components may require that new position data have significant control a current view of a display, and thus, the current view is responsive to changes in the position data. Other rendering components may require that the new position data have less control of the current view of the display, and thus, changes in the current view appear change smoothly based on changes in the position data.

In accordance with certain embodiments, the optimization equation can be modified to include various other weighting or adjustment factors that can be used to affect the impact of new and averaged position information. For example, a confidence factor can be used to affect the impact of the new position information. In accordance with an embodiment, the confidence can be based at least in part on a position of the object in a field of view of a camera of the device or a position of a representation of the object in an image acquired by the camera. For example, the confidence value can be at a first level (e.g., high confidence) when it is determined that the object is within the central areas of the field of view of the camera or within the central areas of image, where the central areas can include a center location of the field of view or central area of the image. The confidence value can be at a second level (e.g., medium confidence) when the object is detected near the edge of the field of view or the edge of the image. The confidence value can be at a third level (e.g., low confidence) when the object is out of the field of view of the camera or not detected in the image. It should be noted that the confidence value can range from zero to one hundred percent, where one hundred percent can correspond to a highest confidence level and zero percent can correspond to a lowest confidence value. One such approach in utilizing the confidence value can be illustrated as:

averaged position information=(new position information strength)*(new position information)* (confidence value)+(100%−new position information strength)*(previously averaged position information))

As described, determining the confidence value can be based at least in part on a position of a representation of an object in an image. A number of approaches can be used to determine the position of the representation of the object. For example, in the situation where the object being detected is a head of a viewer, at least some embodiments can utilize a face or head detection algorithm or other object detection algorithm to attempt to locate an approximate head or face position in a captured image or video frame. This can include, for example, utilizing an algorithm to analyze a central portion or region of the determined head position, in order to attempt to include primarily facial area and not hair or areas just outside the face region due to differences between the actual shape of the user's face and the shape of the bounding box or other such boundary.

Once the facial region to be analyzed is determined, one or more head or face detection algorithms can be used to detect features of the user's face. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. Detecting the facial features can include identifying unique or distinguishing points, facial marks, geometric shapes or distances, or other such features on the face. Example facial features can include at least one of an eye, mouth, nose, among other facial features. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others.

In accordance with an embodiment, the number of detected facial features can be compared to a threshold number of facial features (e.g., 15 different facial features). Further, an amount of the user's face can be determined in the image. Accordingly, in accordance with certain embodiments, the confidence value can be based on a location of one or more detected features, a number of detected features, an amount of head detected, etc. It should be noted that a combination of comparisons can be used. An advantage to using a combination of approaches is that each individual approach might only give a result with 80% confidence, but using them together can result in a confidence of about 96% in at least some embodiments.

Once the averaged position information is determined, the averaged position information can be stored in a data repository 412 or other storage component, be provided to a rendering component, or stored at the object tracking optimization service. As shown in FIG. 4A, the averaged position information is stored in data repository 412 for use as previously averaged position information in one or more optimization approaches. As further shown, the rendering component 408 can acquire the averaged position information. As described, the rendering component can use the position information to render content on a display element 414, where the display element can be local or remote to the computing device. For example, portions of image content (e.g., graphical elements, text, etc.) can appear to be positioned and/or displayed in 3D space such that that some of the content appears closer to a surface of the display screen of the device (and hence the viewer), while other content appears to be further from the surface of the display screen. As the viewer tilts, rotates, or otherwise changes the orientation of the device, or as the viewer's relative position or orientation changes with respect to the device, the content can appear to translate laterally, move back and forth in apparent distance from the surface of the screen, or otherwise change shape or appearance. As the relative position of the viewer and/or orientation of the device changes, the position data indicative of the position of the viewer with respect to the computing device changes and the updated position data can be used to adjust the perspective from which the content is rendered to correspond to changes in the relative viewing angle of the viewer.

Figure 4B:
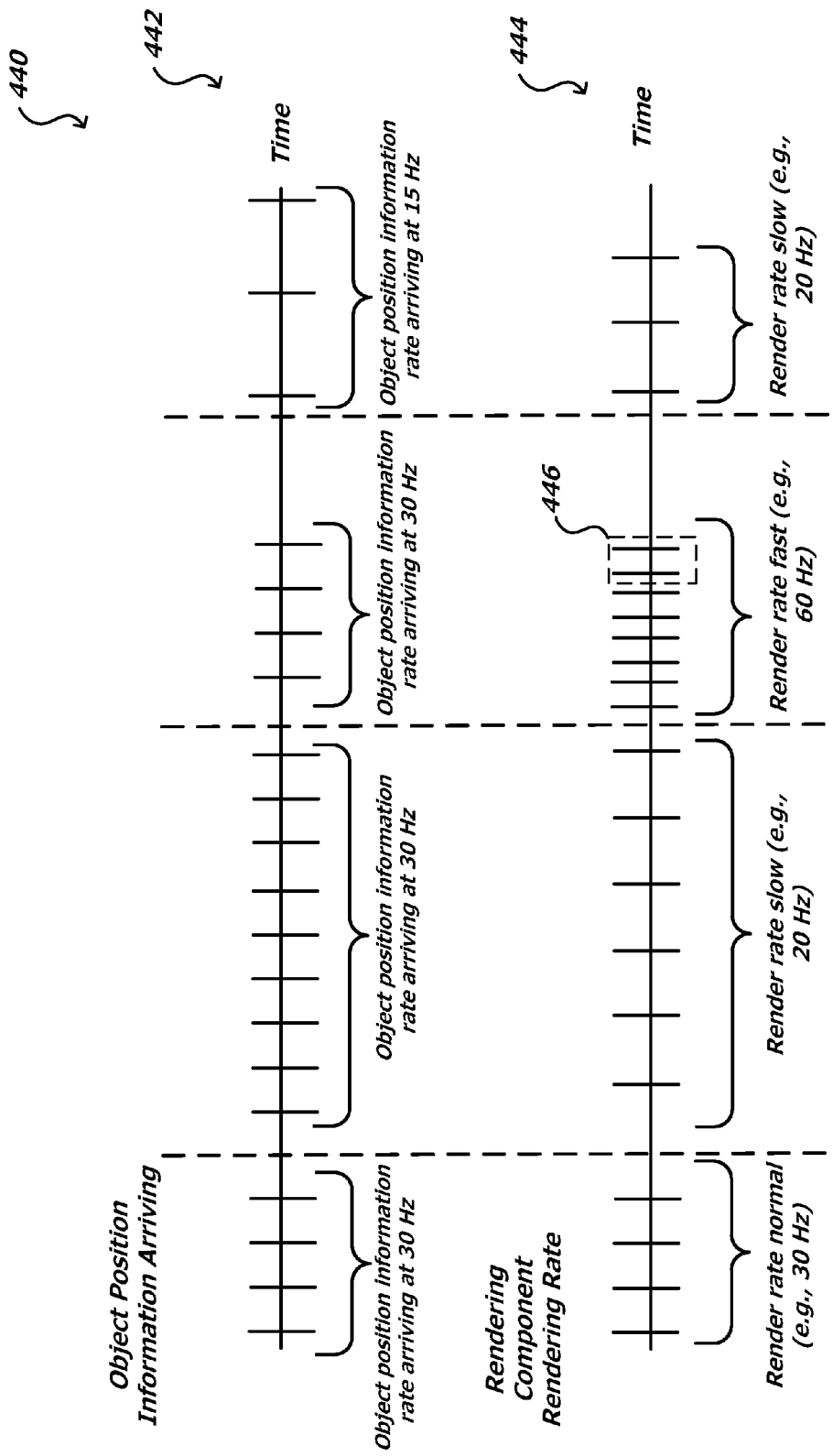
FIG. 4B illustrates example data waveforms received at an optimization service in accordance with an embodiment.

FIG. 4B illustrates example data waveforms received at an optimization service 410 in accordance with an embodiment. As shown in example 440 of FIG. 4B, situation 442 illustrates a graph where position information is received at different rates and situation 444 illustrates a graph where position information is acquired or otherwise requested at different rates. The time units along the horizontal axis can be one of a number of different units, as may include hertz, seconds, etc. With regard to situation 442, each mark along the horizontal axis represents a time when position information is available. In various embodiments, the timing of when the position information is available can vary. For example, as shown in situation 442, the position information can be generated at a rate of 30 Hz and 15 Hz.

With regard to graph 444, each mark along the horizontal axis represents when position information is requested. In accordance with various embodiments, the rate at which the position information is requested can vary, for example, between rendering components and/or can vary during the operation of a respective rendering component. For example, the position information can be request at a normal rate (e.g., 30 Hz), a slow rate (e.g., 20 Hz), and a fast rate (e.g., 60 Hz) or at some other rate. It should be noted that the rates of generating position information and acquiring position information are example rates and other rates are possible.

As described, the rendering component may acquire position information at a rate faster than a rate at which the information is generated or may otherwise acquire position information out of sync with when the position information is available. For example, as shown in graph 444 of FIG. 4B, the object tracking optimization service may acquire the same position data 446 more than once. Accordingly, in accordance with various embodiments, an object tracking optimization service or other data optimizing component of a computing device can be utilized to optimize position information by, e.g., smoothing, averaging, or otherwise processing the information. Approaches enable the object tracking optimization service to acquire position information and make available the information to rendering components, applications, services, and the like. Advantageously, in accordance with various embodiments, although the object tracking optimization service may acquire the same position data more than once, the result of the service does not return the same result merely because the input value remains the same; rather, previously averaged position information can be used in one or more smoothing algorithms of the object tracking optimization service to generate optimized (e.g., averaged) position information. The averaged position information can provide advantages in various image processing applications such as various gesture- and/or motion-based input that can be used for head tracking, gaze tracking, and the like. Such approaches enable relatively complex gestures to be interpreted and object tracking to be performed with lower cost and power consumption than conventional approaches.

Figure 5:
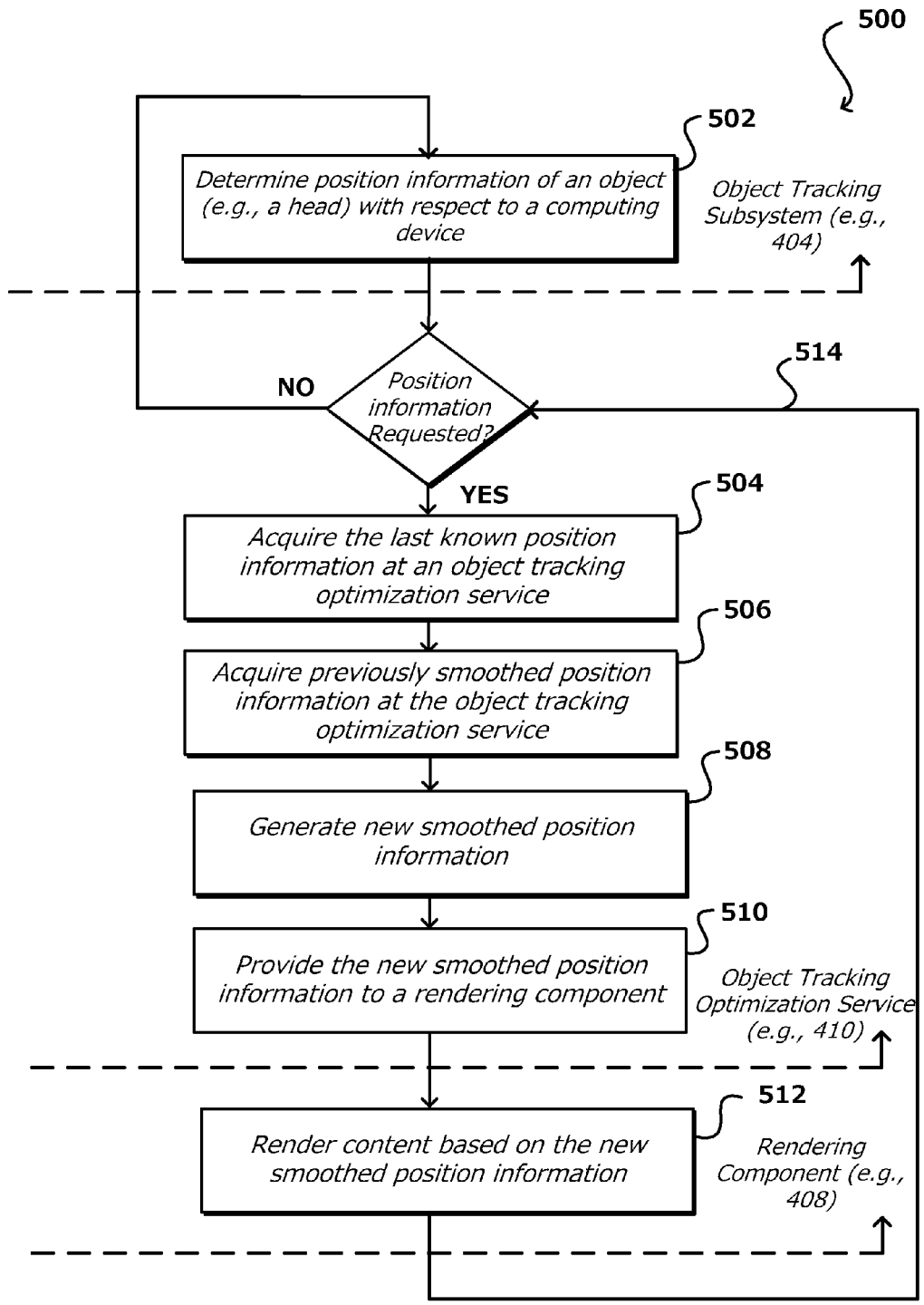
FIG. 5 illustrates an example process for optimizing object tracking in accordance with various embodiments.

FIG. 5 illustrates an example process 500 for optimizing object tracking in accordance with various embodiments. It should be understood that, for various processes discussed herein, there can be additional, fewer, or alternative steps performed in similar or alternative orders, or at least partially in parallel, in accordance with the various embodiments unless otherwise stated. Further, the entire process can be performed on a single device in some embodiments, while at least portions of the process can be performed using one or more other computing devices, such as a remote server, in accordance with various embodiments. In accordance with various embodiments, position information of an object (e.g., a head) with respect to a computing device can be determined 502. For example, the position information can be determined using a camera of the device, where at least one image of a viewer of the computing device can be acquired, and by analyzing the image, position information indicative of a position of the viewer with respect to the computing device can be determined. For example, the image can be analyzed to identify a plurality of feature points. This can include using one or more feature detection algorithms to detect feature points or other points. For example, the feature points can be detected by using one of a number of detection algorithms, such as scale-invariant feature transform (SIFT), speeded up robust features (SURF), among others. Based at least in part upon the plurality of feature points, one or more feature vectors representative of a representation of the object can be determined. Based at least in part on the one or more feature vectors, a location of the representation of the object with respect to the computing device can be determined, where the location can include the position information. Additionally or alternatively, the relative position and/or orientation of a viewer of a computing device can be acquired using one of more motion sensors (e.g., a gyroscope, an accelerometer, etc.) of the device. In still other embodiments, an object tracking subsystem (e.g., object tracking subsystem 404 in FIG. 4A) can generate the position information. In any situation the position information can correspond to a position of at least a portion of a head of a viewer of the computing device with respect to the computing device.

In response to receiving a request for the position information by, for example, a rendering component, the position information (herein also known as new position information or last known position information) can be acquired 504 by an object tracking optimization service, rendering component, application, data optimizing component, subsystem or the like. When the position information is not requested, the position information can be stored in a data repository (e.g. data repository 406 of FIG. 4A), in cache, etc. In accordance with various embodiments, the new position information can be associated with a first weighting factor, where the first weighting factor can correspond to a strength of the new position information. In certain embodiments, the first weighting factor can be determined by, for example, acquiring a responsiveness metric, where the responsiveness metric can correspond to a number of frames of position information; acquiring a penetration percentage, where the penetration percentage corresponding to a level of control of the number of frames of position information; and determining the first weighing factor based at least in part on the penetration percentage and the responsiveness metric.

Second position information (herein also known as previously averaged position information or previously smoothed position information) can be acquired 506 by the object tracking optimization service (e.g., object tracking optimization service 410 of FIG. 4A). The second position information can be acquired at a second variable rate. In accordance with various embodiments, the first variable rate of generating the new position information can be different (or the same) than the second variable rate of requesting the position information. In various embodiments, the first variable rate can correspond to a rate at which position information is generated and the second variable rate can correspond to a rate at which the position information is requested to render content on a display screen. In accordance with various embodiments, the second variable rate is adjusted based on actions of a viewer of the device, such as a gaze direction of a viewer of the device. Accordingly, one such approach to adjusting the second variable rate can include, for example, detecting a gaze direction of a viewer of the computing device; and adjusting the second variable rate based at least in part on the gaze direction, the second variable rate being increased in response to determining the gaze direction substantially towards the computing device and the second variable rate being decreased in response to determining the gaze direction substantially away the computing device. It should be noted that approaches to detecting the gaze direction of a person are known in the art, and will not be described herein.

The previously smoothed position information can be associated with a second weighting factor, where the second weighting factor can correspond to a portion or percentage of the first weighting factor. New smoothed position information can be generated 508 by the object tracking optimization service based at least in part on the new position information and corresponding first weighting factor and the previously smoothed position information and corresponding second weighting factor using at least one smoothing algorithm. The new smoothed position information can be provided 510 to a rendering component (e.g., rendering component 408 of FIG. 4A), application, service, or other component, and can be used by the rendering component to render 512 content. For example, portions of image content (e.g., graphical elements, text, etc.) can appear to be positioned and/or displayed in 3D space such that that some of the content appears closer to a surface of the display screen of the device (and hence the viewer), while other content appears to be further from the surface of the display screen. As the viewer tilts, rotates, or otherwise changes the orientation of the device, or as the viewer's relative position or orientation changes with respect to the device, the content can appear to translate laterally, move back and forth in apparent distance from the surface of the screen, or otherwise change shape or appearance. The relative movements can be based upon factors such as the distance of the viewer to the device, a direction of movement of the user, a direction of change in orientation of the device, or other such factors. The relative movements can be selected such that the different content appears to be positioned in three dimensions with respect to each other, and act appropriately with changes in relative position and/or orientation, and thus viewing angle, of the viewer.

In some situations, it may be desirable to operate the device in a "steady state" mode, where when it is determined that a head of the user is not moving relative to the device, the position information provided to the device remains constant. For example, in certain situations, although the object is no longer moving, the position data may indicates a level of movement, which can cause a view on a display screen to appear to move. Accordingly, several approaches can be implemented to enter a steady state mode. In one such approach, an amount of movement of the head of the viewer can be tracked over a set of images and when it is determined that the amount of movement is below a threshold level of movement, steady state position information can be generated, where the steady state position information corresponding to position information having substantially a same value. A rendering component, application, or other service that utilizes such position information can acquire the position information having substantially a same value, and can render a view on a display screen that does not appear to move. The device can exit the steady state mode when the amount of movement at least meets the threshold level of movement for a determined number of image frames. Accordingly, as the device enters and exits the steady data mode, position information can be provided such that the transition is linear, in that the transition from a "still" view to a "moving" view is gradual.

In accordance with an embodiment, the responsiveness or how quickly a change in position of the viewer with respect to the device affects the appearance of content displayed can be modified by adjusting one or more weighing factors, confidence factors, and the like to account for various application and system requirements. For example, one such approach includes detecting an amount of movement of a computing device with respect to an object; determining an amount of acceleration of the computing device based at least in part on the amount of movement; and decreasing a weighting factor during a time the computing device is accelerating.

In accordance with various embodiments, generating the averaged position information can further be based at least in part on a confidence value. In this example, an image can be acquired using a camera of the computing device, where the image can include a representation of a portion of a head of the viewer of the computing device. Based on a location of the portion of the head, a confidence value can be determined, where the confidence value can correspond to an amount of the representation of the portion of the head of the viewer detected in the image. Based at least in part on the confidence value, the averaged position information can be generated. Determining the confidence value can include, for example, determining the amount of the portion of the head included in the image, and determining that the amount meets at least one of a plurality of thresholds, each threshold of the plurality of thresholds corresponding to a respective confidence value.

Figure 6:
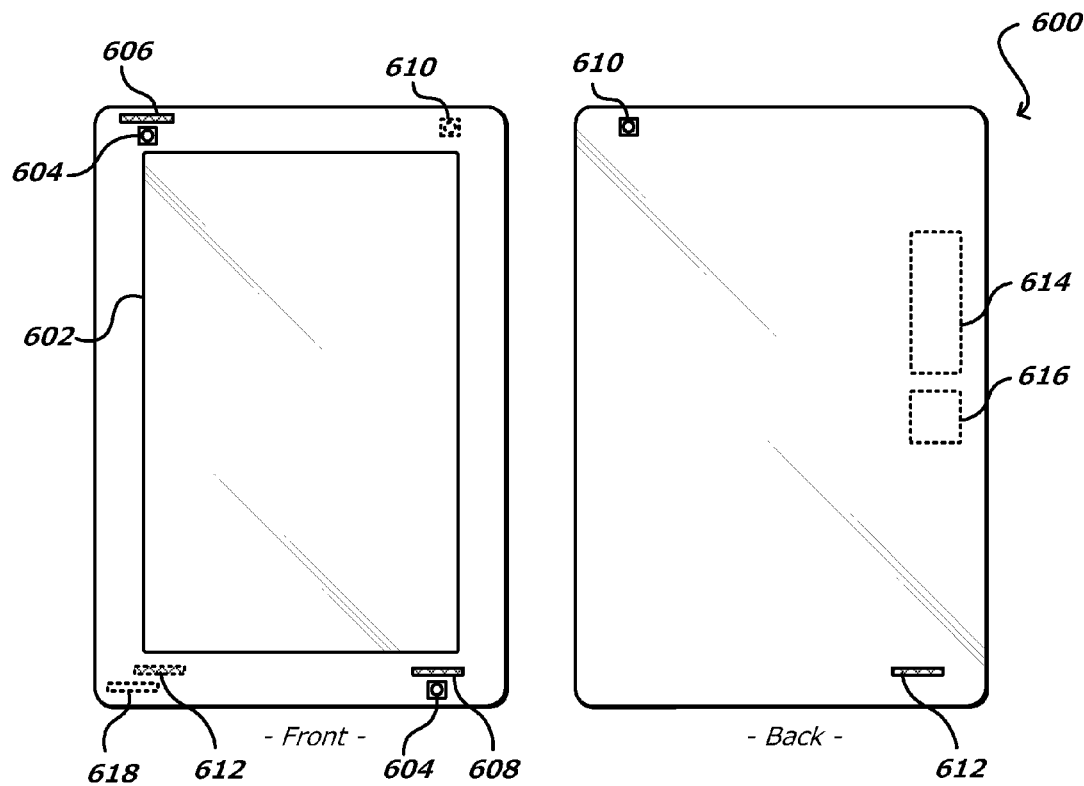
FIG. 6 illustrates front and back views of an example portable computing device that can be used in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled component (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These motion sensing elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such component. Various other elements and/or combinations are possible as well within the scope of various embodiments.

Figure 7:
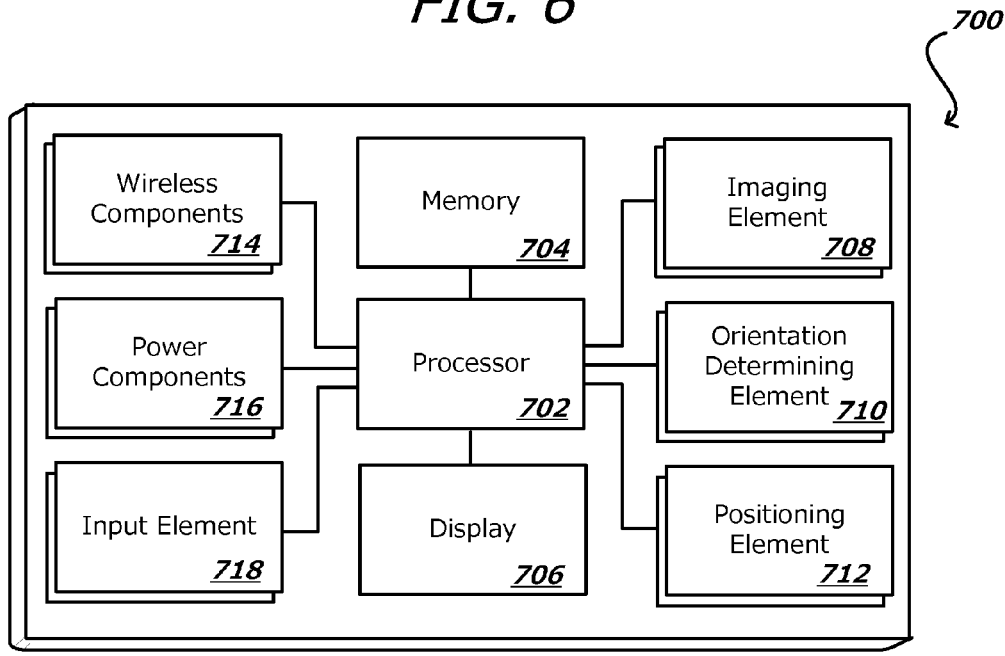
FIG. 7 illustrates an example set of basic components of a portable computing device, such as the device described with respect to FIG. 6.

FIG. 7 illustrates a set of basic components of an electronic computing device 600 such as the device 700 described with respect to FIG. 6. In this example, the device includes at least one processing unit 702 for executing instructions that can be stored in a memory component or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, a motion sensor such as an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 718 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
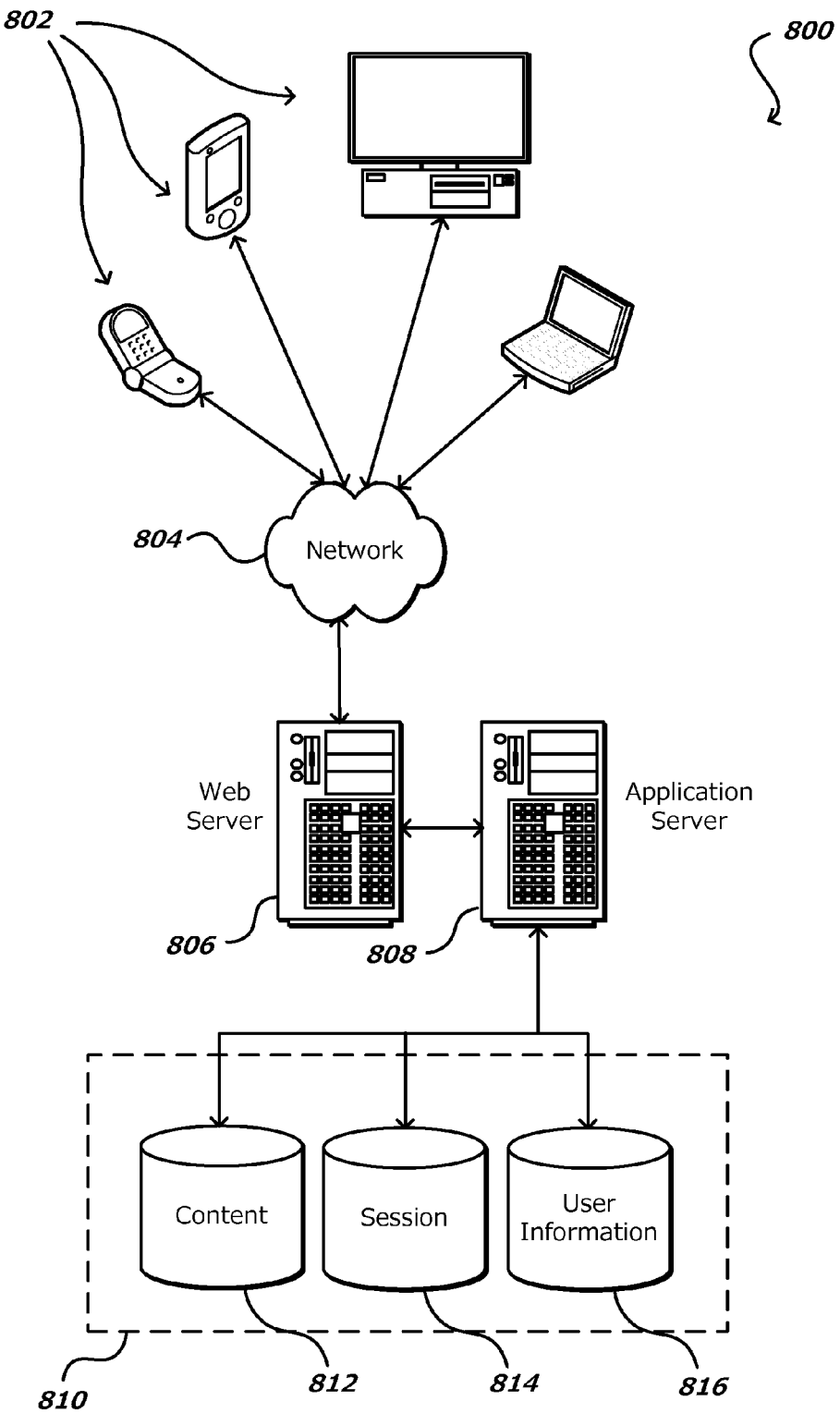
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a display screen;
   a computing device processor;
   a head tracking subsystem configured to generate position information corresponding to a position of a head of a viewer of the computing device relative to the computing device;
   a data optimizing component configured to utilize an averaging function to average position information;

a memory device including instructions that, when executed by the computing device processor, cause the computing device to:
  acquire the position information by the data optimizing component;
  associate the position information with a first weighting factor, the first weighting factor configured to control a responsiveness of displayed content due to a change in the position of the head of the viewer;
  acquire previously averaged position information;
  associate the previously averaged position information with a second weighting factor, the first weighting factor being different from the second weighting factor;
  generate averaged position information by applying the at least one averaging function to the position information, the first weighting factor, the previously averaged position information, and the second weighting factor;
  acquire, by a rendering component configured to operate on the computing device, the averaged position information from the data optimizing component; and
  render, by the rendering component and based on the averaged position information, content at a variable rate.

2. The computing device of claim 1, wherein the instructions when executed to generate the averaged position information, further cause the computing device to:
  acquire image data using a camera of the computing device, the image data including a representation of a portion of the head of the viewer;
  determine a confidence value corresponding to how much of the head of the viewer is detected in the image data; and
  generate the averaged position information to render the content on the confidence value.

3. The computing device of claim 2, wherein the instructions when executed to determine the confidence value, further cause the computing device to:
  determine an amount of the portion of the head represented in the image data; and
  determine that the amount of the portion of the head meets at least one of a plurality of thresholds, each threshold of the plurality of thresholds corresponding to a respective confidence value.

4. The computing device of claim 3, wherein the instructions when executed to determine the first weighting factor, further cause the computing device to:
  receive a responsiveness metric corresponding to the position information;
  receive a penetration percentage corresponding to a level of control of the position information; and
  determine the first weighting factor based on the penetration percentage and the responsiveness metric.

5. A computer implemented method, comprising:
  receiving first averaged position information that is associated with first position information corresponding to a gaze direction of a user within a first period of time;
  receiving a first weighting factor associated with the first averaged position information;
  receiving, at a first rate, second position information corresponding to the gaze direction within a second period of time; receiving a second weighting factor associated with the second position information;
  determining second averaged position information by applying an averaging algorithm to the second position information, the second weighting factor, the first averaged position information, and the first weighting factor;
  determining a second rate for rendering data representing a view of content that corresponds to the second averaged position information, the second rate being greater in frequency when the gaze direction is substantially towards a specified object than when the gaze direction is substantially away from the specified object; and
  rendering the data at the second rate.

6. The computer implemented method of claim 5, further comprising:
  determining the second position information from at least one of image data acquired by a camera, sensor information acquired by a motion sensor, or a service configured to provide the second position information, the service providing the second position information based on a combination of first position data determined from the image data and second position data determined from the sensor information.

7. The computer implemented method of claim 6, further comprising:
  analyzing the image data to identify feature points;
  determining, based on the feature points, a feature vector corresponding to a representation of the user; and
  determining the second position information based on the feature vector.

8. The computer implemented method of claim 5, wherein the averaging algorithm includes at least one of an exponential moving average algorithm, or a moving average algorithm.

9. The computer implemented method of claim 5, further comprising:
  receiving a responsiveness metric corresponding to a number of frames of the second position information;
  receiving a penetration percentage corresponding to a level of control of the number of frames of the second position information; and
  determining the second weighting factor based on the penetration percentage and the responsiveness metric.

10. The computer implemented method of claim 5, further comprising:
  detecting an amount of movement of the specified object with respect to the user;
  determining an amount of acceleration of the specified object based on the amount of movement; and
  decreasing the second weighting factor for a period of time the specified object is accelerating.

11. The computer implemented method of claim 5, further comprising:
  determining a confidence value corresponding to a level of representation of the user in image data acquired by a camera, wherein the second averaged position information is further based on the confidence value.

12. The computer implemented method of claim 11, wherein the confidence value is based on a number of features detected in the representation of the user, a location of the representation of the user in the image data, and a number of predetermined features detected in the representation of the user.

13. The computer implemented method of claim 5, further comprising:
  determining a type of rendering component configured to render the view of content or an amount of graphics rendered on a display screen, wherein the second rate is further based on the type of rendering component or the amount of graphics.

14. The computer implemented method of claim 5, further comprising:
tracking an amount of movement of the user over a set of image data representing a plurality of images;
determining that the amount of movement is below a threshold level of movement; and
generating steady state position information.

15. A computing device, comprising:
a display screen;
a computing device processor; and
a memory device including instructions that, when executed by the computing device processor, cause the computing device to:
receive first averaged position information that is associated with first position information corresponding to a gaze direction of a user within a first period of time;
receive a first weighting factor associated with the first averaged position information;
receive, at a first rate, second position information corresponding to the gaze direction within a second period of time;
receive a second weighting factor associated with the second position information;
determine second averaged position information based by applying an averaging algorithm to the second position information, the second weighting factor, the first averaged position information, and the first weighting factor;
determine a second rate for rendering data representing a view of content that corresponds to the second averaged position information, the second rate being greater in frequency when the gaze direction is substantially towards the computing device than when the gaze direction is substantially away from the computing device; and
render the data at the second rate.

16. The computing device of claim 15, wherein the instructions when executed further cause the computing device to:
determine a type of rendering component configured to render the view of content or an amount of graphics rendered on the display screen, wherein the second rate is further based on the type of rendering component or the amount of graphics.

17. The computing device of claim 15, wherein the computing device further comprises a camera, and wherein the instructions when executed further cause the computing device to:
determine a confidence value corresponding to a level of representation of the user in image data acquired by the camera, wherein the second averaged position information is generated based on the confidence value.

18. The computing device of claim 15, wherein the instructions when executed further cause the computing device to:
determine the second position information from at least one of image data acquired by a camera of the computing device, sensor information acquired by a motion sensor of the computing device, or a service configured to provide the second position information, the service providing the second position information based on a combination of first position data determined from the image data and second position data determined from the sensor information.

19. The computing device of claim 15, wherein the instructions when executed further cause the computing device to:
receive a responsiveness metric corresponding to a number of frames of the second position information;
receive a penetration percentage corresponding to a level of control of the number of frames of the second position information; and
determine the second weighting factor based on the penetration percentage and the responsiveness metric.

20. The computing device of claim 15, wherein the instructions when executed further cause the computing device to:
detect an amount of movement of the computing device with respect to the user;
determine an amount of acceleration of the computing device on the amount of movement; and
decrease the second weighting factor for a period of time the computing device is accelerating.

* * * * *